US006793252B1

(12) United States Patent
Mattes

(10) Patent No.: US 6,793,252 B1
(45) Date of Patent: Sep. 21, 2004

(54) METHOD FOR MACHINING A COMMON RAIL, COMMON RAIL, AND CONNECTION STUB FOR APPLICATION OF THE METHOD

(75) Inventor: Patrick Mattes, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 09/856,638

(22) PCT Filed: Aug. 19, 2000

(86) PCT No.: PCT/DE00/02839

§ 371 (c)(1),
(2), (4) Date: Aug. 20, 2001

(87) PCT Pub. No.: WO01/23749

PCT Pub. Date: Apr. 5, 2001

(30) Foreign Application Priority Data

Sep. 29, 1999 (DE) ........................................ 199 46 611

(51) Int. Cl.[7] ................................................ F16L 43/00
(52) U.S. Cl. ..................................... 285/192; 285/125.1
(58) Field of Search .............................. 285/125.1, 190, 285/192, 197

(56) References Cited

U.S. PATENT DOCUMENTS

| | | | | |
|---|---|---|---|---|
| 1,767,028 A | * | 6/1930 | Williams | 285/192 |
| 2,409,262 A | * | 10/1946 | Eldred | 285/126.1 |
| 2,605,140 A | * | 7/1952 | Bartling | 239/590.3 |
| 2,674,785 A | * | 4/1954 | Crawley | 285/192 |
| 2,846,241 A | * | 8/1958 | McDonnell | 285/192 |
| 3,219,366 A | * | 11/1965 | Franck | 285/190 |
| 4,518,033 A | * | 5/1985 | Gartner | 165/53 |
| 4,711,259 A | * | 12/1987 | Martin et al. | 134/166 R |
| 5,261,705 A | * | 11/1993 | Takahashi et al. | 285/197 |
| 5,927,615 A | * | 7/1999 | Turk | 239/590.3 |
| 5,979,945 A | * | 11/1999 | Hitachi et al. | 285/125.1 |
| 6,082,397 A | * | 7/2000 | Casolari et al. | 137/561 A |
| 6,415,768 B1 | * | 7/2002 | Usui | 123/468 |

FOREIGN PATENT DOCUMENTS

| | | | | |
|---|---|---|---|---|
| DE | 197 44 762 A1 | | 1/1998 | |
| GB | 810 | * | 1/1905 | 285/192 |

* cited by examiner

*Primary Examiner*—Eric K. Nicholson
(74) *Attorney, Agent, or Firm*—Ronald E. Greigg

(57) ABSTRACT

The invention relates to a common rail for a common rail fuel injection system of an internal combustion engine, having a base body whose interior communicates with a plurality of connection openings. To increase the high-pressure strength, one elongated connection stub extends through each associated connection opening into the interior of the base body.

4 Claims, 1 Drawing Sheet

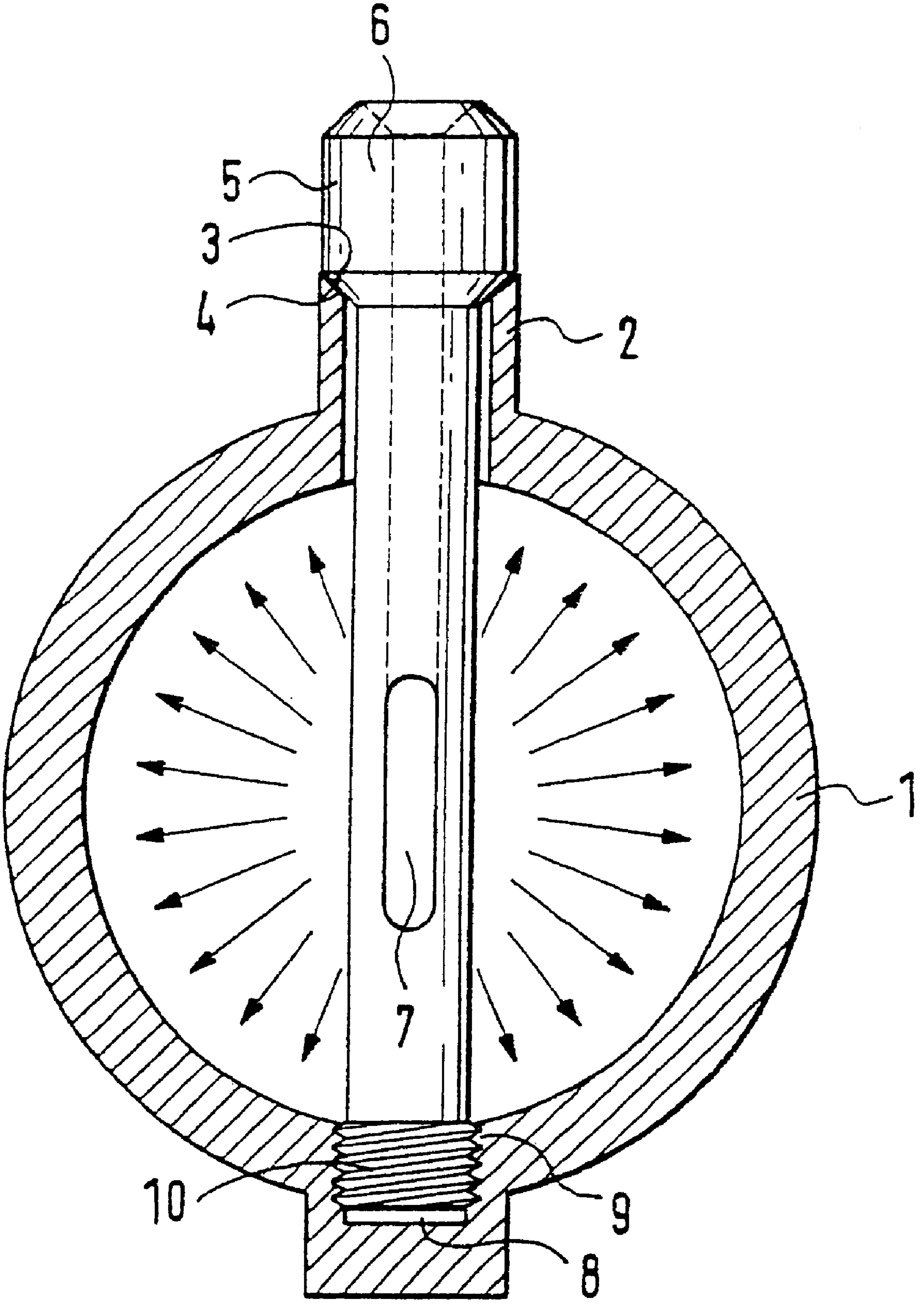
6
5
3
4
2
1
7
10
9
8

METHOD FOR MACHINING A COMMON RAIL, COMMON RAIL, AND CONNECTION STUB FOR APPLICATION OF THE METHOD

CROSS-REFERENCE TO RELATED APPLICATION

This application is a 35 USC 371 application of PCT/DE 00/02839 filed on Aug. 19, 2000.

BACKGROUND OF THE INVENTION

1. Field of the Invention

The invention relates to a common rail for a common rail fuel injection system of an internal combustion engine, having a base body whose interior communicates with a plurality of connection openings.

2. Description of the Prior Art

In known common rail injection systems, a high-pressure pump pumps the fuel to be injected, optionally with the aid of a prefeed pump, from a tank into the central high-pressure fuel reservoir, which is known as a common rail. From the rail, fuel lines lead to the individual injectors, which are assigned one to each of the engine cylinders. The injectors are triggered individually by the engine electronics as a function of the engine operating parameters, for injection of fuel into the assigned engine combustion chamber.

A conventional common rail is described in German patent disclosure DE 195 48 611, for example. The known common rail withstands pressures of up to about 1100 bar.

OBJECTS AND ADVANTAGES OF THE INVENTION

The primary object of the invention is to increase the high-pressure strength of the known common rail by simple provisions. It should also be feasible to produce the common rail of the invention economically.

In a common rail for a common rail fuel injection system of an internal combustion engine, having a base body whose interior communicates with a plurality of connection openings, this object is attained in that one elongated connection stub extends through each associated connection opening into the interior of the base body. Within the context of the present invention, it has been demonstrated that the region of intersection between the connection openings and base body interior, especially at high internal pressures, forms a weak point that can tend to fail from fissuring or cracking. This critical region is relieved by the load applied to the connection stub. As a result, even at high internal pressures, a long service life is assured. The present invention makes it possible, using conventional materials and production processes, to produce especially pressure-proof common rails economically.

In one embodiment of the invention the elongated connection stub extends through the interior of the base body and is secured, on the side of the base body opposite the connection opening, and at least one through opening is provided in the segment of the connection stub that is disposed in the base body interior. This offers the advantage that in the region of the connection opening, no fastening means for the connection stub have to be provided. The through opening makes it possible for fuel, subjected to high pressure, to flow out of the connection stub to reach the base body interior.

A further feature of the invention is that the connection stub is braced on the outward-oriented side of the connection opening and is subjected to tensile stress in the assembled state. This leads to a bracing of the base body in the region of intersection between the connection openings and the base body interior. The forces resulting from the bracing counteract the hydraulic forces in the base body interior. This reliably prevents fissuring at high internal pressures. The common rail according to the invention can be operated at a higher rail pressure than conventional common rails.

A further feature of the invention is that on the end of the connection stub opposite the connection opening, a male thread is embodied which cooperates with a female thread that is provided in a corresponding bore in the base body. As a result, the assembly of the connection stub is simplified and at the same time easy replacement of the connection stub is made possible. The degree of bracing can be adjusted in an infinitely graduated way by way of the depth to which the connecting stub is screwed into the female thread.

A further feature of the invention is that on the outward-oriented end of the connection stub, a cone is embodied that cooperates with a complimentary face on the base body in the region of the associated connection opening. Via the cone, the tensile force is transmitted from the connection stub to the base body.

BRIEF DESCRIPTION OF THE DRAWINGS

Further advantages, characteristics and details of the invention will become apparent from the ensuing description taken in conjunction with the single drawings showing a cross section through a common rail embodying the invention.

DESCRIPTION OF THE PREFERRED EMBODIMENT

In the drawing, one embodiment of a common rail of the invention is shown in cross section and includes a tubular base body 1. A likewise tubular connection piece 2 is embodied on the tubular base body 1. The common rail of the invention has a plurality of tubular connection pieces. The connection pieces serve to connect high-pressure fuel lines that lead to the individual injectors. The connection pieces further serve for instance to receive pressure sensors. Instead of the tubular base body 1, a spherical base body (not shown) can also be used.

The outward-oriented face end 3 of the tubular connection piece 2 is embodied in the shape of a funnel. The funnel-shaped face end 3 cooperates with a cone 4 that is embodied on a collar 5. The collar 5 is a part of a tubular connection stub 6, which extends through the tubular connection piece 2 into the interior of the tubular base body 1. A through opening 7 in the tubular connection stub 6 allows fuel to pass through.

The end of the connection stub 6 remote from the tubular connection piece 2 is secured in a blind bore 8 in the tubular base body 1. The bore 8 is disposed diametrically opposite the tubular connection piece 2. The bore 8 is also equipped with a female thread 9, which cooperates with a male thread 10 that is embodied on the end of the connection stub 6.

The foregoing relates to preferred exemplary embodiments of the invention, it being understood that other variants and embodiments thereof are possible within the spirit and scope of the invention, the latter being defined by the appended claims.

What is claimed is:

1. A common rail for a common rail fuel injection system of an internal combustion engine, the common rail comprising a base body (1) having an interior communicating with at least one connection opening (2), and an elongated tubular connection stub (6) extending through each said connection opening (2) into the interior of the base body (1), wherein each said elongated tubular connection stub (6) extends through the interior of the base body (1) and is secured, on the side of said base body (1) opposite the connection opening (2), and at least one through opening (7) formed in the segment of said connection stub (6) that is disposed in said base body interior and further comprising a male thread formed at the end of each said elongated tubular connection stub (6) opposite the connection opening (2), and a female thread (9) formed in a corresponding blind bore (8) in the base body (1) in position to engage said male thread.

2. A common rail for a common rail fuel injection system of an internal combustion engine, the common rail comprising a base body (1) having an interior communicating with at least one connection opening (2), and an elongated tubular connection stub (6) extending through each said connection opening (2) into the interior of the base body (1), wherein each said elongated tubular connection stub (6) extends through the interior of the base body (1) and is secured, on the side of said base body (1) opposite the connection opening (2), and at least one through opening (7) formed in the segment of said connection stub (6) that is disposed in said base body interior, wherein each said elongated tubular connection stub (6) is braced on the outward-oriented side of the associated connection opening (2) and is subjected to tensile stress in the assembled state and further comprising a male thread formed at the end of each said elongated tubular connection stub (6) opposite the connection opening (2), and a female thread (9) formed in a corresponding blind bore (8) in the base body (1) in position to engage said male thread.

3. The common rail of claim 1, further comprising a cone-shaped surface formed on the outward-oriented end of each said elongated tubular connection stub (6), and a complimentary cone-shaped face (3) formed on said base body (1) in the region of the associated connection opening (2) cooperating with said cone-shaped surface on said connection stub.

4. The common rail of claim 2, further comprising a cone-shaped surface formed on the outward-oriented end of each said elongated tubular connection stub (6), and a complimentary cone-shaped face (3) formed on said base body (1) in the region of the associated connection opening (2) cooperating with said cone-shaped surface on said connection stub.

* * * * *

UNITED STATES PATENT AND TRADEMARK OFFICE

CERTIFICATE OF CORRECTION

PATENT NO. : 6,793,252 B1
DATED : September 21, 2004
INVENTOR(S) : Patrick Mattes It is certified that error appears in the above-identified patent and that said Letters Patent is hereby corrected as shown below:

Title page,
Item [56], References Cited, FOREIGN PATENT DOCUMENTS, please correct to read as follows:

-- FOREIGN PATENT DOCUMENTS

| | | |
|---|---|---|
| DE | 197 44 762 A1 | 1/1998 |
| EP | 0 866 221 A | 9/1998 |
| EP | 0 915 252 A | 5/1999 |
| GB | 810 | 1/1905 -- |

Signed and Sealed this

Twenty-third Day of November, 2004

JON W. DUDAS
*Director of the United States Patent and Trademark Office*